Feb. 5, 1952  D. F. PRZYBYLSKI  2,584,287
DIGGING ADJUSTMENT FOR ENDLESS
TYPE TRENCH EXCAVATORS
Filed Sept. 7, 1948  10 Sheets-Sheet 6
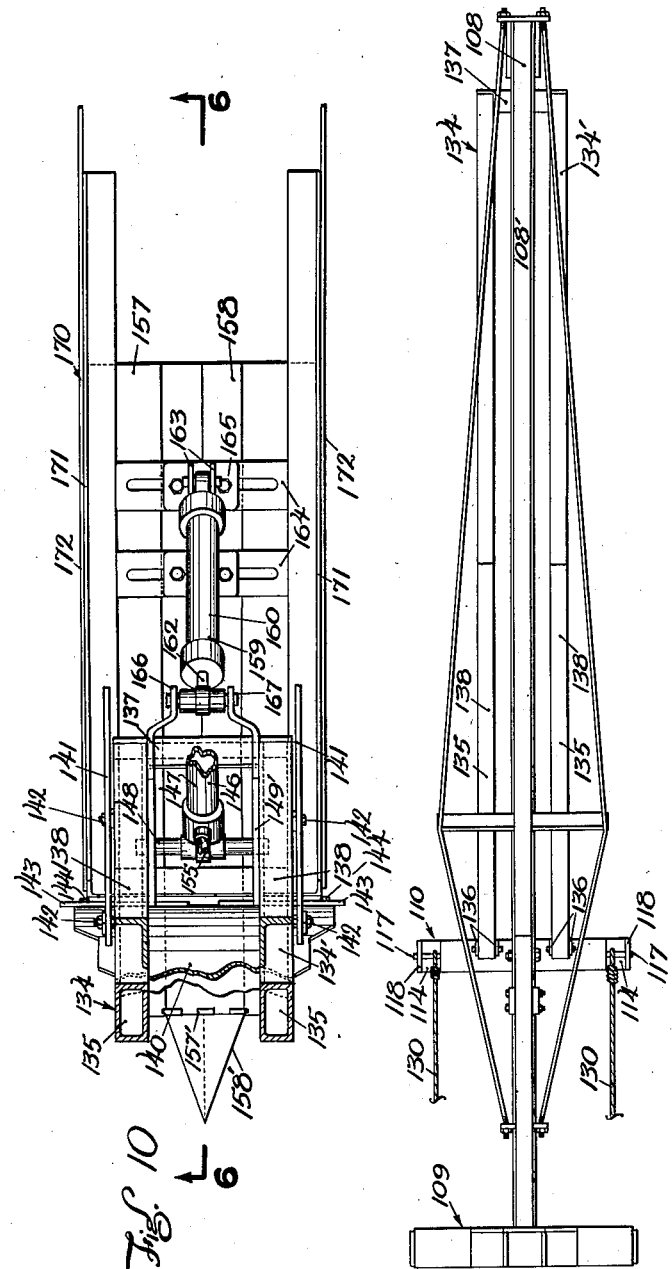
INVENTOR.
Daniel F. Przybylski
BY Harry N. Kilgore
Attorney Feb. 5, 1952 D. F. PRZYBYLSKI 2,584,287
DIGGING ADJUSTMENT FOR ENDLESS
TYPE TRENCH EXCAVATORS
Filed Sept. 7, 1948 10 Sheets-Sheet 7
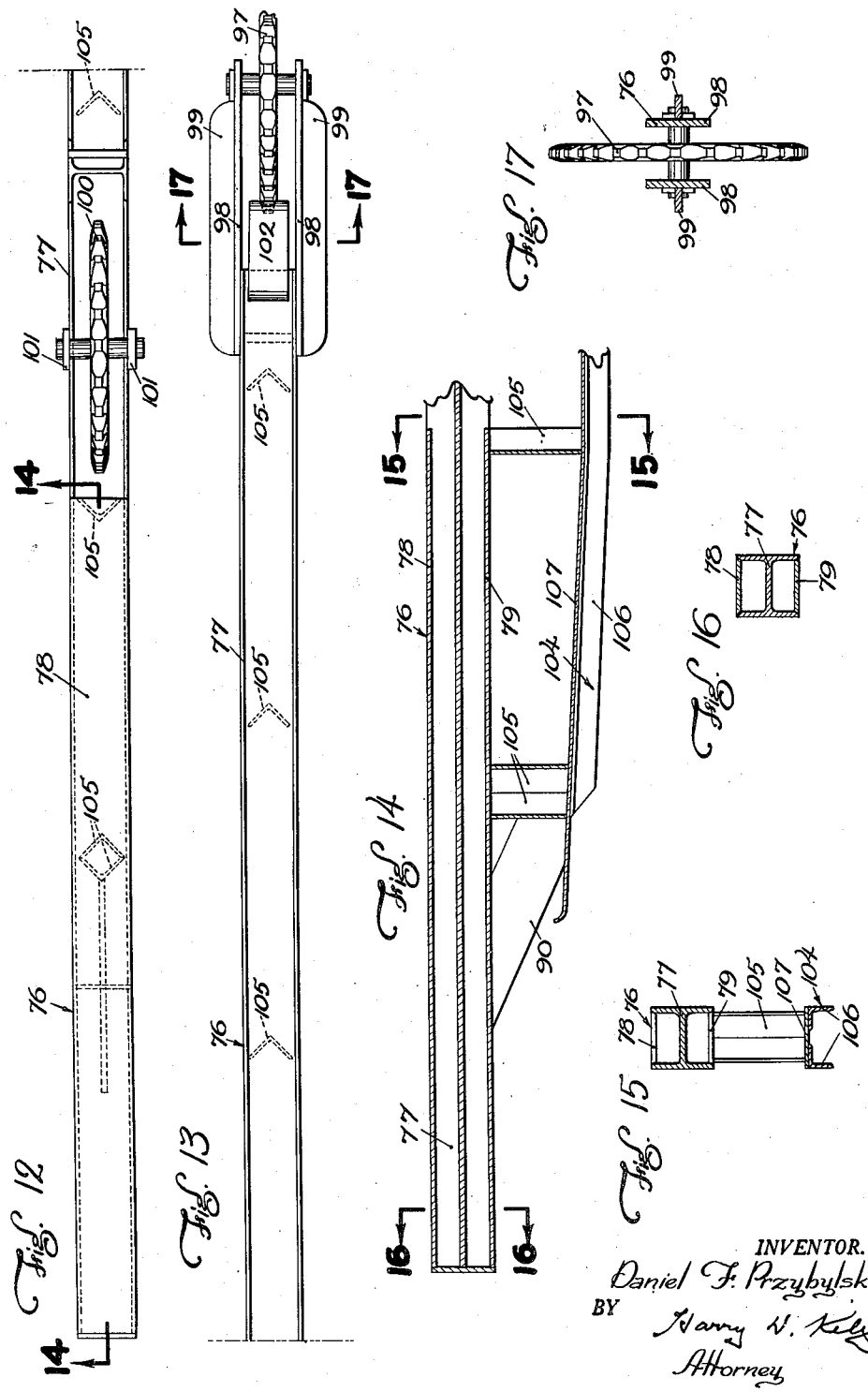
INVENTOR.
Daniel F. Przybylski
BY Harry N. Kilgore
Attorney

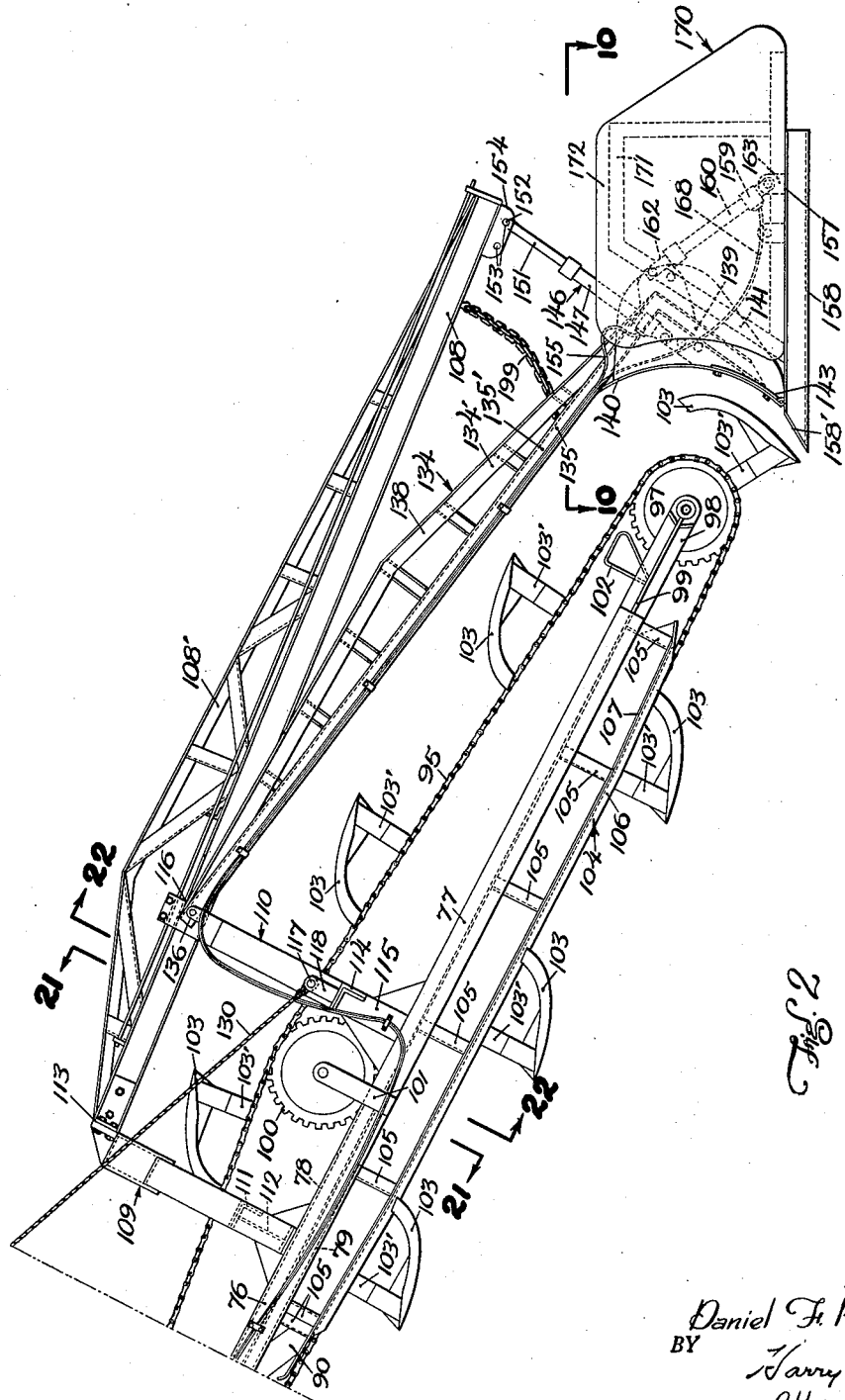

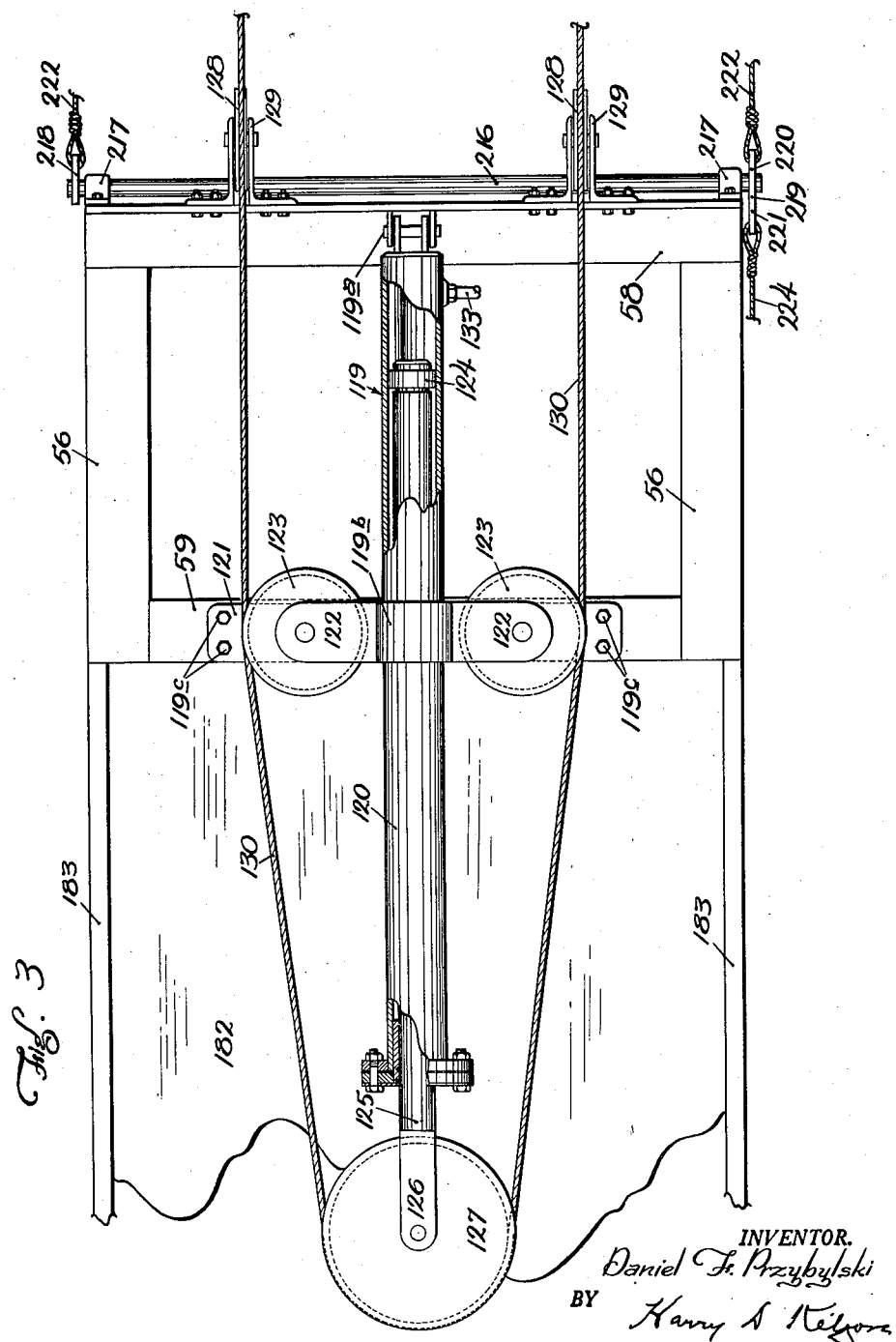

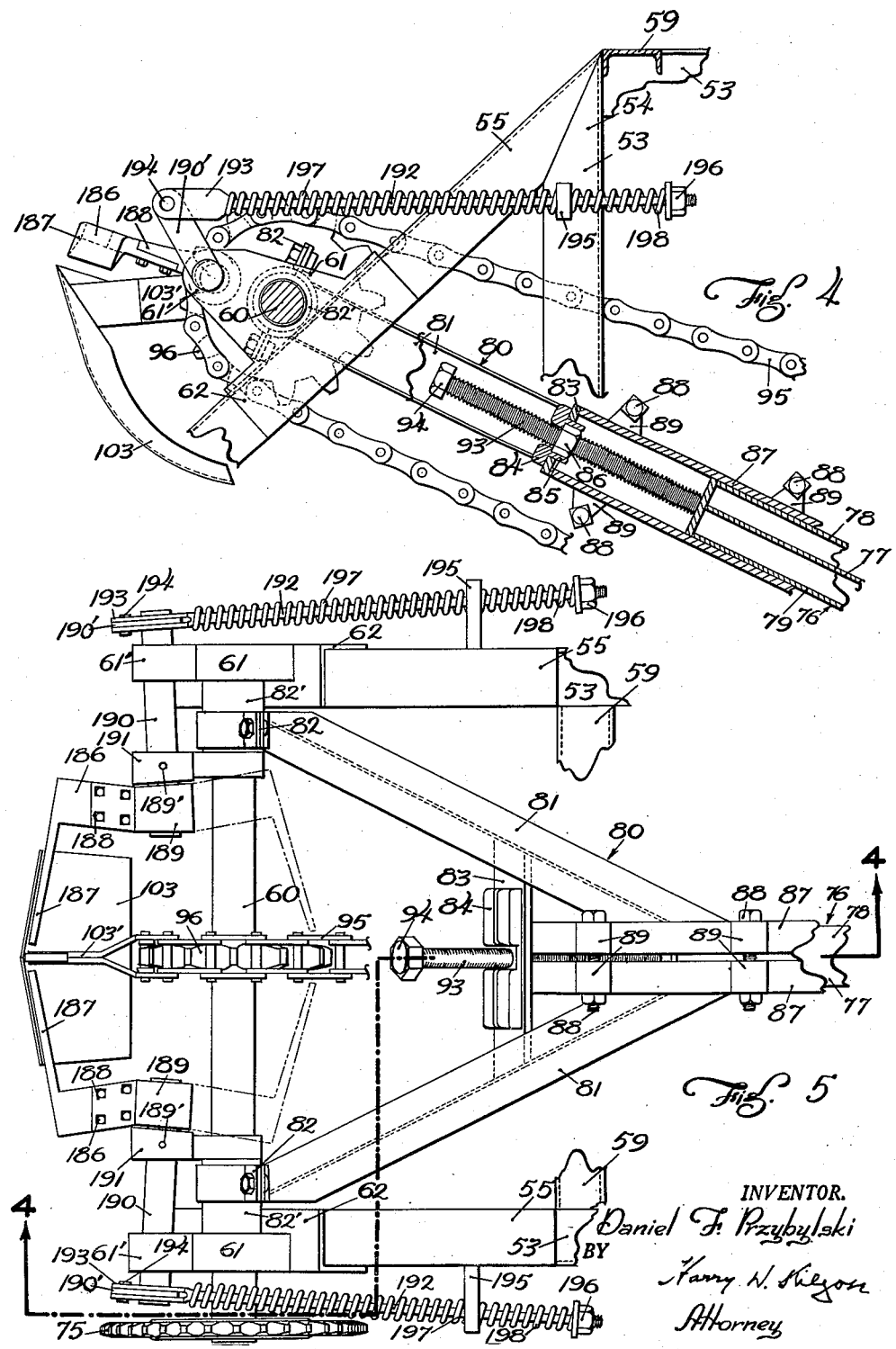

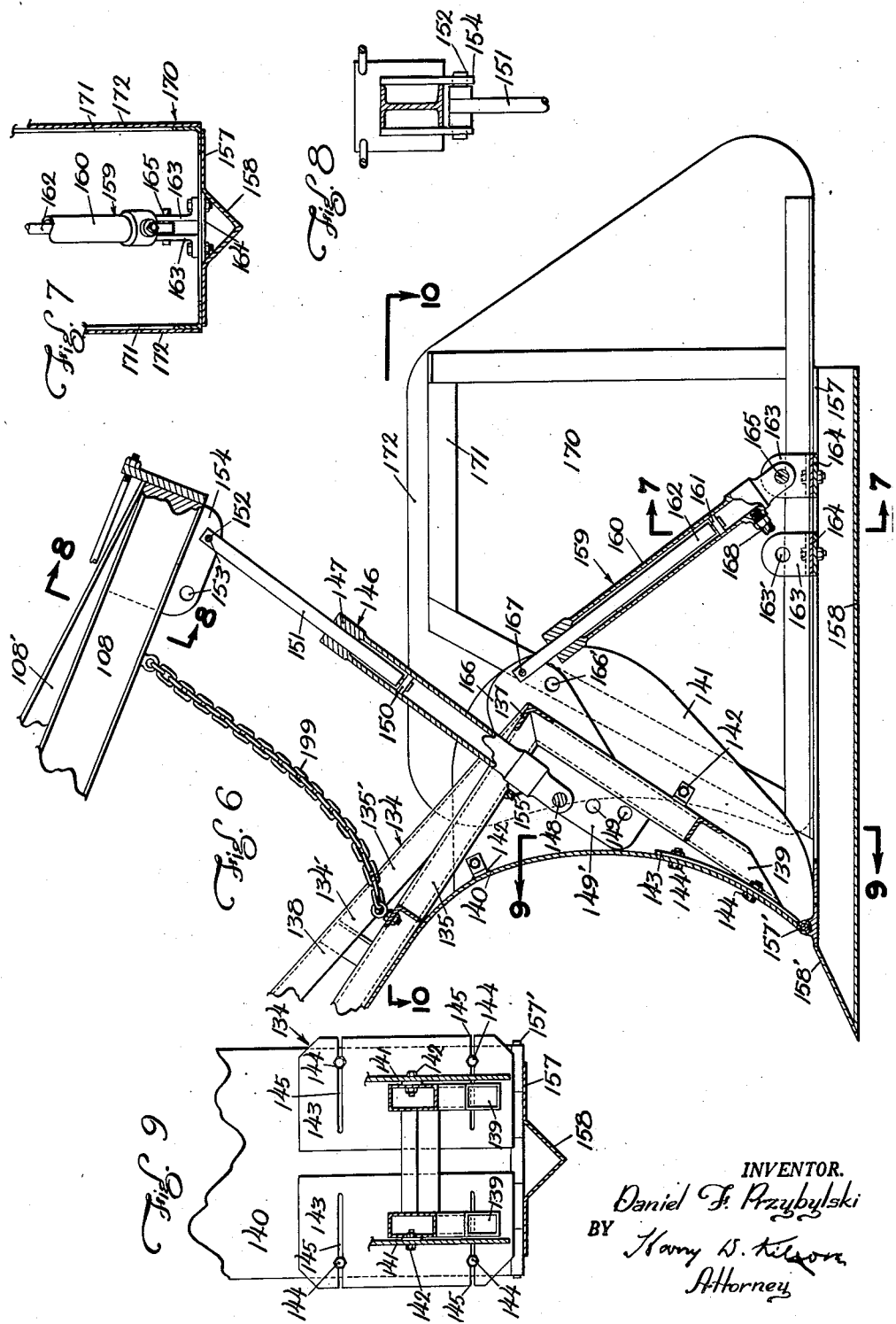

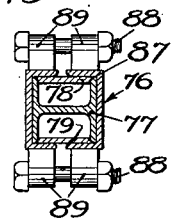
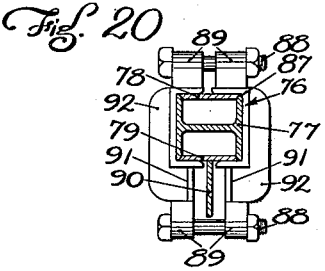
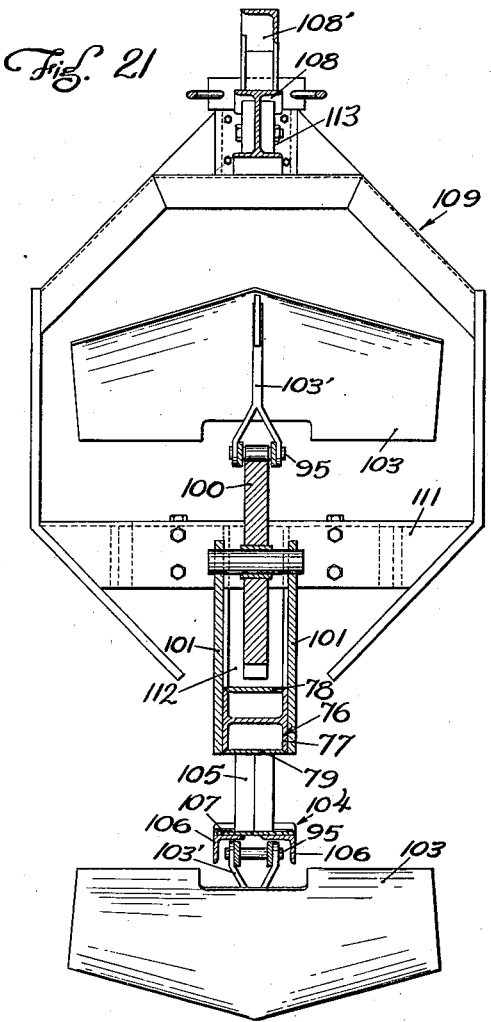
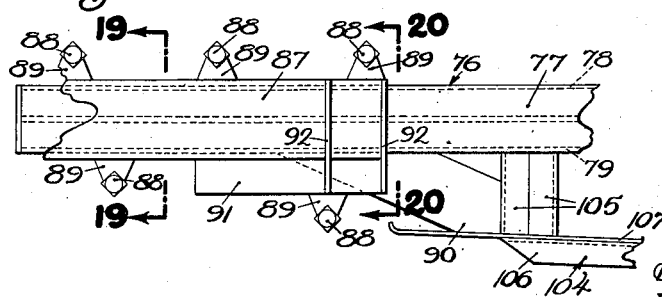

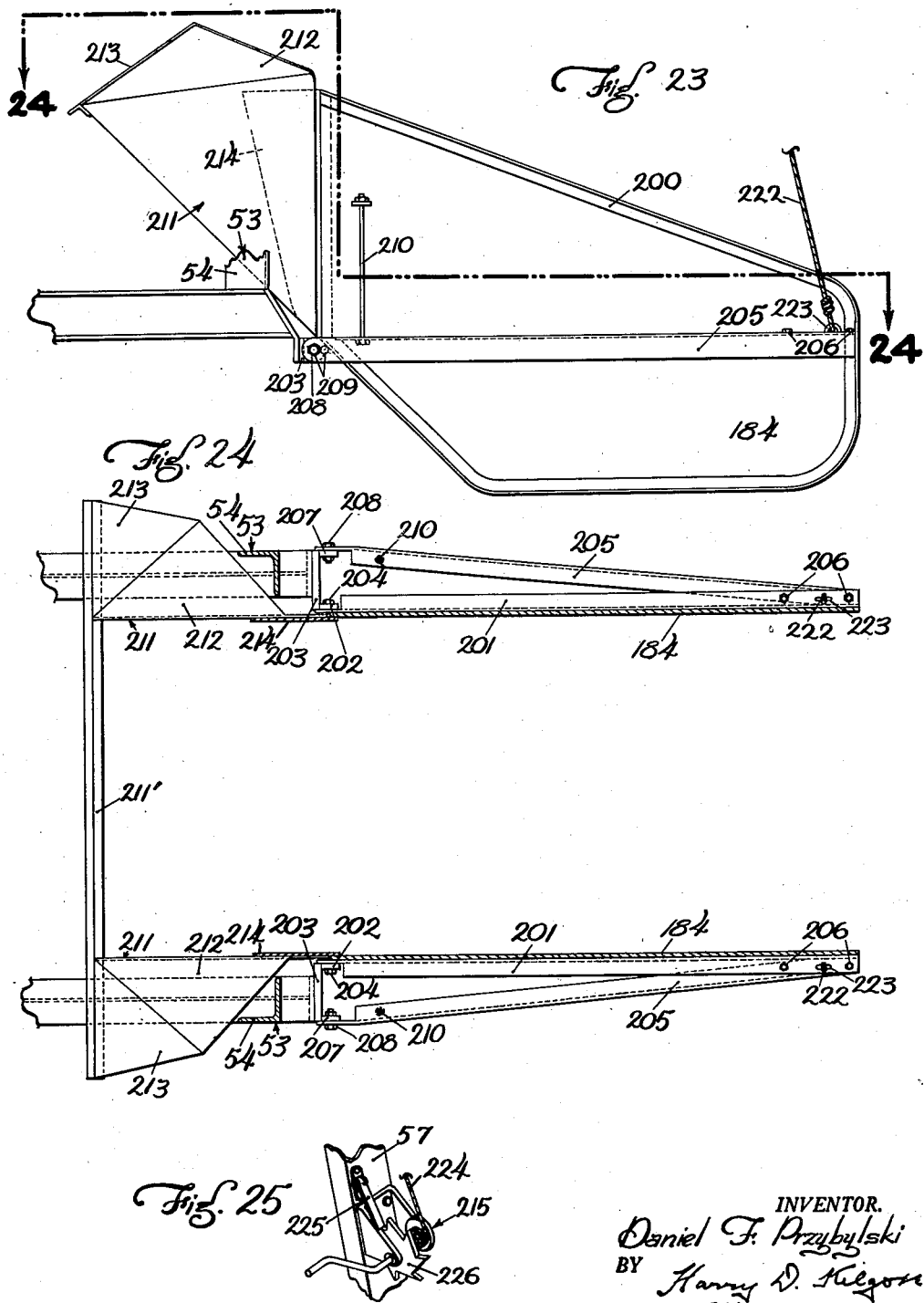

Patented Feb. 5, 1952

2,584,287

UNITED STATES PATENT OFFICE 2,584,287

DIGGING ADJUSTMENT FOR ENDLESS TYPE TRENCH EXCAVATORS

Daniel F. Przybylski, Winona, Minn.

Application September 7, 1948, Serial No. 48,121

9 Claims. (Cl. 37—90)

My invention relates to improvements in trench excavators, and, more particularly, to such an excavator of the ladder type.

An object of this invention is to provide a self-contained and self-propelled trench excavator.

Another object of this invention is to provide a trench excavator having a novel grade holder and crumber.

Still another object of this invention is to provide novel ram controls for the crumber.

A further object is to provide novel driving connections from an engine for operating an endless shovel chain having attached shovels.

A further object of this invention is to provide a novel hydraulic lift for a shovel boom.

Other objects of this invention will be apparent from the following description and the accompanying drawings.

To the above end, generally stated, the invention consists of the novel devices hereinafter described and defined in the claims.

In the accompanying drawings, which illustrate the invention, like characters indicate like parts throughout the several views.

Referring to the drawings:

Figs. 1 and 2 are left-hand side elevational views of the improved trench excavator showing, respectively, the front end portion and the rear end portion thereof;

Fig. 3 is a fragmentary detail view in plan of the hydraulic boom lift and associated parts;

Fig. 4 is a detail view partly in side elevation and partly in longitudinal vertical section taken on the irregular line 4—4 of Fig. 5;

Fig. 5 is a plan view of the parts shown in Fig. 4;

Fig. 6 is a fragmentary detail view partly in side elevation and partly in longitudinal vertical section taken on the line 6—6 of Fig. 10;

Figure 1:
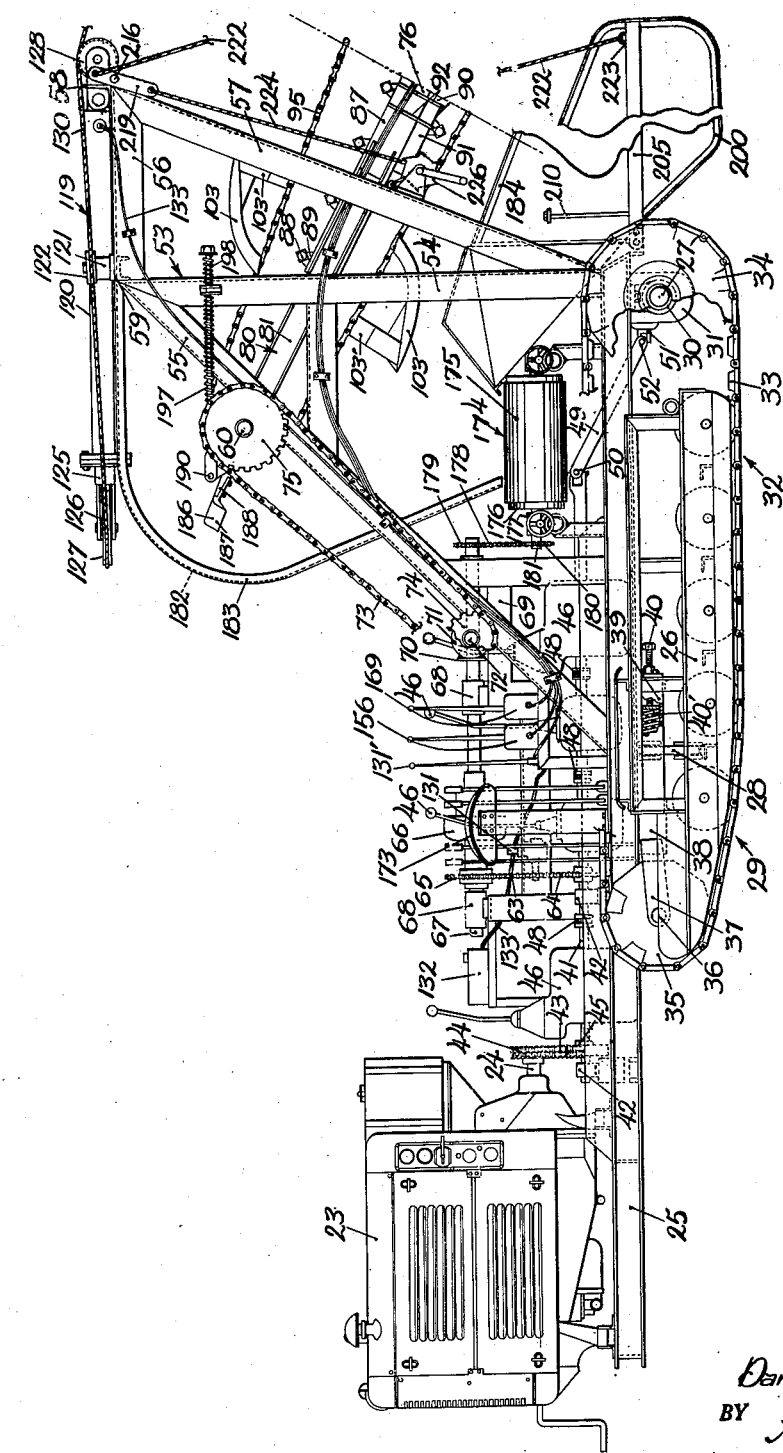
Figure 22:
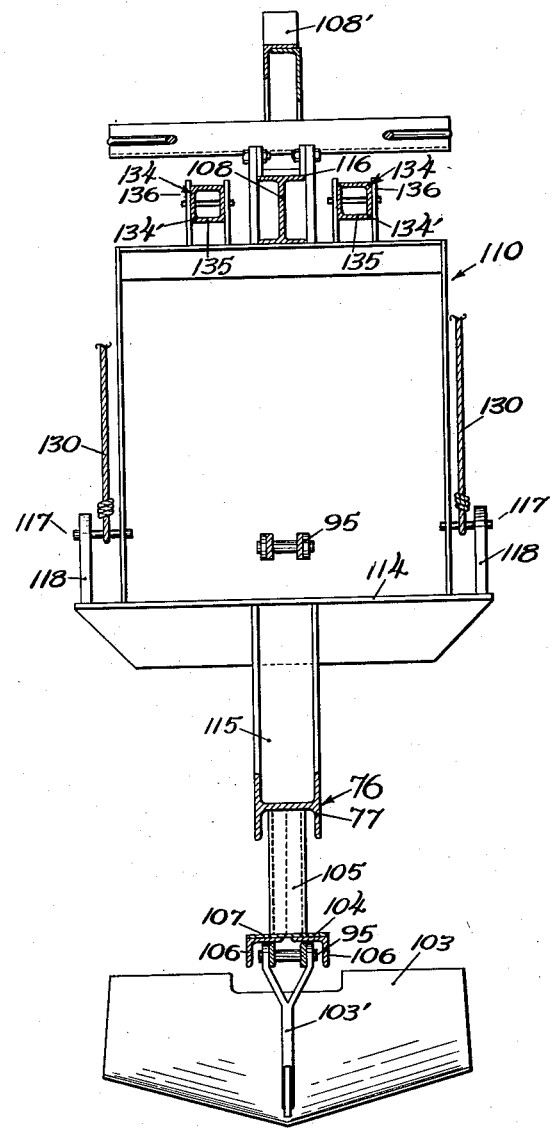

Figs. 7, 8 and 9 are fragmentary detail views partly in elevation and partly in section taken on the lines 7—7, 8—8, and 9—9 respectively of Fig. 6;

Fig. 10 is a fragmentary view principally in plan with some parts sectioned on the line 10—10 of Fig. 6;

Fig. 11 is a plan view of the hydraulic grade holder beam and the underlying crumber, on the same scale as Figs. 1 and 2;

Figs. 12 and 13 are plan views showing, respectively, the front and the rear sections of the shovel boom;

Fig. 14 is a view in longitudinal central section taken on the line 14—14 of Fig. 12, and further showing on the same section line the shovel conveyor chain guide;

Figs. 15 and 16 are detail views in section taken on the lines 15—15 and 16—16 of Fig. 14;

Fig. 17 is a detail view partly in elevation and partly in section taken on the line 17—17 of Fig. 13;

Fig. 18 is a fragmentary view in side elevation showing the connected portions of the shovel boom and its head;

Figs. 19 and 20 are detail views partly in end elevation and partly in transverse section taken on the lines 19—19 and 20—20 of Fig. 18, respectively;

Fig. 21 is a view partly in end elevation and partly in transverse section taken on the line 21—21 of Fig. 2;

Fig. 22 is a view partly in end elevation and partly in transverse section taken on the line 22—22 of Fig. 2;

Fig. 23 is a side elevational view of the dirt shields and also showing a fragment of the main side frame;

Fig. 24 is a view partly in plan and partly in section taken on the irregular line 24—24 of Fig. 23; and Fig. 25 is a perspective view of the winch for adjusting the dirt shields and a fragment of the main side frame to which it is attached.

It may be here stated that Figs. 1, 2 and 11 are all on the same scale and all of the other figures are on the same scale but on a larger scale than the first noted scale.

The trench excavator, which is the subject-matter of my present invention, is a self-contained unit propelled by an internal combustion engine indicated, as an entirety, by the numeral 23 with the exception of its shaft 24. This engine 23 is mounted on the front end portion of a bed 25 forming a part of a novel vehicle which includes two side frames 26, a rear driven axle 27, a front member 28 and two full tracks 29. The rear axle 27 is mounted in an axle housing 30 having as a part thereof a differential housing 31. The axle housing 30 extends transversely under the rear end portion of the bed 25 and is rigidly secured thereto. The front member 28 connects the side frames 26 to the bed 25 for limited oscillatory movements in vertical planes.

Each full track 29 includes a multiplicity of hingedly connected cleats 32 in endless arrangement and each cleat 32 has a cog or tooth 33. The full tracks 29 run over driven sprocket wheels 34 on the rear axle 27 and idle front sprocket wheels 35 each having a short axle 36 journaled in a pair of laterally spaced bearings 37 on the front end of a horizontal member 38 slidably mounted in an elongated box-like structure 39 secured to the respective side frame 26. Each member 38 is endwise adjusted by a screw 40 as a take-up for the full track. A compression spring 40' is interposed between each member 38 and adjusting screw 40.

In place of the full tracks 29, half-tracks or three-quarter tracks may be substituted therefor and with such substitution, the machine will provided with front pneumatic tires, or dual pneumatic tires may be used in place of the tracks.

The rear axle 27 is driven from the engine 23 by the following connections, to wit: a long sectional drive shaft 41, journaled in bearings 42 on the bed 25, is driven at its front end from the engine shaft 24 by a sprocket chain 43 that runs over triple sprocket wheels 44 and 45 on the engine shaft 24 and the drive shaft 41, respectively. The connections also include, in connection with the drive shaft 41, four transmissions 46 and a flexible coupling 48 between each adjacent pair of transmissions 46. The drive shaft 41 has an oblique rear end extension 49 connected thereto by a universal joint 50 and to a short shaft 51 by a second universal joint 52, and which short shaft forms a part of the differential mechanism in the housing 31.

On the rear end portion of the bed 25 are upstanding main side frames 53 made up of angle bars. Each side frame 53 includes an upright bar 54 substantially directly over the rear axle housing 30, an oblique bar 55 that extends from the top of the bar 54 forwardly and downwardly to the bed 25, a short horizontal bar 56 that extends rearwardly from the upper end of the upright bar 54 and an oblique bar 57 that extends from the lower end of the upright bar 54 to the outer end of the horizontal bar 56. The two side frames 53 are rigidly connected at the rear end portions of the horizontal frame bars 56 by an angle bar 58, and at the front end portions of said bars by a channel bar 59.

A shovel drive shaft 60 is journaled in bearings 61 on short angle bars 62 nested on the oblique side frame bars 55. This shovel drive shaft 60 is driven from the drive shaft 41 by the following connections, to wit: a sprocket chain 63 runs over a sprocket wheel 64 on the drive shaft 41, between the first and the second transmissions 46, and a sprocket wheel 65 secured to a safety clutch 66 on a shaft 67 spaced above the drive shaft 41 and extending parallel thereto. This shaft 67 is journaled in bearings 68 on a secondary frame 69 on the bed 25. On the rear end of the shaft 67 is a bevel pinion 70 that meshes with a bevel gear 71 on a lower countershaft 72 journaled in bearings on the side frame bars 55. A sprocket chain 73 runs over a sprocket wheel 74 on the lower countershaft 72 and a sprocket wheel 75 on the shovel drive shaft 60.

A shovel boom 76 projects rearwardly from the shovel drive shaft 60 and is mounted thereon for vertical swinging movement. This boom 76, as shown, is a long H-bar 77, the front end portion of which is shown in Fig. 12 and the rear end portion of which is shown in Fig. 13. The major portion of the section of the boom 76, shown in Fig. 12, is provided with top and bottom cover plates 78 and 79, respectively, rigidly secured to the longitudinal edge portions of the flanges of the H-bar 77, see Fig. 16. The flanges of the H-bar 77 and the cover plates 78 and 79 form a box-like structure that extends from the front end of said H-bars rearwardly, see Figs. 12 and 14.

The shovel boom 76, on its front end portion, has a V-shaped head 80, the arms 81 of which diverge forwardly and have on their front ends two-part clamps 82 turnably mounted on short sleeves 82' on the shovel drive shaft 60 and support the boom 76 for vertical swinging movement. The sleeves 82' form integral parts of the bearings 61. The arms 81 are rigidly and intermediately connected by a transverse plate 83. A casting 84 is rigidly secured to the outer face of the plate 83 and has on its inner face a central boss 85, that extends through an aperture in said plate, see Figs. 4 and 5. This boss 85 has a hexagonal recess in which is rigidly secured a correspondingly formed nut 86. On the inner end portion of the arms 81 is a long two-part sleeve 87 in which the front end of the H-bar 77 is slidably mounted. The members of the sleeve 87 are channels and the flanges thereof are in opposing relation and slightly spaced apart, see Fig. 20. These members of the sleeve 87 are connected by upper and lower pairs of nut-equipped tie-bolts 88 that extend through aligned holes in lugs 89 on said members The end of a brace 90 is rigidly secured to the bottom plate 79, at the transverse center thereof, for a purpose which will presently appear. The brace 90, as shown, is a flat plate set edgewise in a vertical plane and is downwardly and rearwardly inclined, see Figs. 14 and 18. The brace 90 extends between the members of the sleeve 87, at the rear end portion thereof, and hence it is necessary to offset the lower rearmost tie-bolts 88 to afford clearance therefor by means of a pair of flat bars 91 and two pairs of ribs 92. The flat bars 91 extend longitudinally and vertically edgewise under the lower flanges of the sleeve 87 and are rigidly affixed thereto and the pair of ribs 92 which are on the sides of the sleeve 87, extend thereunder to the flat bars 91 and are rigidly affixed to said sleeve and flat bars. The lower rearmost pair of lugs 89 depend from the flat bars 91 and the ribs 92 and are rigidly affixed thereto, see Figs. 18 and 20. A long adjusting screw 93 having a hexagonal head 94, by which it may be turned, has threaded engagement with the nut 86 and its inner end impinges the closed front end of the H-bar 77. Obviously, by turning the screw 93, the H-bar 77 may be endwise adjusted relative to the boom head 80 to afford a take-up for a shovel conveyor chain, as will presently appear.

A heavy endless shovel conveyor sprocket chain 95 runs over a sprocket wheel 96 keyed to the shovel drive shaft 60, midway between the clamps 82 on the boom head arms 81 and an idle sprocket wheel 97. This idle sprocket wheel 97 is journaled in a pair of laterally spaced side bars 98 rigidly secured to the outer faces of the H-bar 77 and forms a rear end extension thereof. On the outer side of each side bar 98, at the transverse center thereof, is a reinforcing rib 99 that extends substantially the full length of said side bar. The ribs 99, at their rear ends, are forked and extend to the longitudinal edges of the side bars 98 to further reinforce the same at the bearings for the idle sprocket wheel 97.

A large directional sprocket wheel 100, over which the upper section of the sprocket chain 95 runs, is journaled in bearings 101 secured to the side flanges of the H-bar 77 on the outer faces thereof just rearwardly of the rear end of the top cover plate 78 and support said sprocket wheel above the web of the H-bar 77, see Fig. 2. A guard 102 is secured to the H-bar 77 close to the idle sprocket wheel 97 to prevent sagging of the upper run of the sprocket chain 95 as it passes onto said sprocket wheel.

A plurality of shovels 103 are secured to certain of the links in the conveyor chain 95 by means of posts 103' spaced equidistantly apart. The lower run of the conveyor chain 95 moves in a guide 104, in the form of an inverted channel, during its upward travel. This guide 104 is rigidly held suspended from the H-bar 77 by short upright angle bars 105 with their flanges in diverging relation to the longitudinal axis of said bar. These angle bars 105 are used singly except the foremost one, where the sprocket chain 95 leaves the guide 104, which is double with the two angle bars 105 in opposing relation to form a hollow square structure that is held by the brace 90, see Figs. 14 and 18. The shovel sprocket chain guide 104 comprises a pair of angle bars 106 and a web 107 connecting the same. It will, of course, be understood that a single channel bar may be used in place of the angle bars 106 and web 107. The purpose of the guide 104 is that when the machine is digging, pressure on the shovels 103 will cause the same to push upwardly against the guide 104, as a base of resistance, and act as struts for the posts 103' and thus prevent backward tilting thereof by digging pressure. Tilting of the posts 103' would, in turn, tilt the shovels 103 downwardly and thereby cause the same to dig in and prevent a uniform cut for each shovel 103. This guide 104 also serves the purpose of reinforcing the shovel boom 76 and guides the shovels 103 to make a straight cut.

A grade holder 108 in the form of a stationary beam having a reinforcing truss 108' overlies the shovel boom 95 in the plane thereof, and is rigidly secured to said boom by means of a front mount or anchor 109 and a rear mount 110. The front mount 109 is a fabricated octagonal structure that extends transversely of the shovel boom 76. The top of the front mount 109 is horizontal and there is a gap in the under side thereof. The lower oblique sides of the front mount 109 are rigidly connected by a transverse angle bar 111. A short post 112 supports the front mount 109 on the shovel boom 76 and to which boom and the angle bar 111 said post is rigidly secured. The grade holder 108, at its front end portion, is rigidly secured and anchored to the front mount 109, as indicated at 113, see Fig. 21.

The rear mount 110 is a rectangular fabricated structure that extends transversely of the shovel boom 76 and its bottom member is a large angle bar 114, the end portions of which extend outwardly of the side members of said mount. A short post 115 supports the mount 110 on the shovel boom 76 and is rigidly secured to the angle bar 114 and boom 76, see Fig. 22. The grade holder 108 rests on the top of the rear mount 110 and is rigidly secured thereto, as indicated at 116. Anchor pins 117, for a purpose which will presently appear, extend through aligned holes in the side members of the rear mount 110 and upstanding side bars 118 on the outer end portions of the angle bar 114 and laterally spaced from said side members, see Fig. 2. The upper run of the shovel chain 95 extends through the two mounts 109 and 110.

The shovel boom 76 is operated by a hydraulic lift 119 that includes a long horizontal cylinder 120 supported on the angle bar 58 to which it is hinged, as indicated at 119$^a$. This cylinder 120 is further supported in a sleeve 119$^b$ forming a part of a casting 121 on the channel bar 59 and secured thereto by bolts 119$^c$. Formed with the sleeve 119$^b$ on each side of the cylinder 120 is a bearing 122, to which bearing and the casting 121 a large directional grooved wheel 123 is journaled. A piston 124 in the cylinder 120 has a piston rod 125 that works through the front end of said cylinder. On the outer end of the piston rod 125 is a bifurcated bearing 126 to which is journaled a large grooved wheel 127. A pair of directional grooved wheels 128 is journaled in bearings 129 on the frame angle bar 58. The pair of wheels 123 and the wheel 127 are horizontally disposed and the wheels 128 are vertically disposed. A cable 130, folded upon itself, extends at its intermediate portion, around the wheel 127 and its folded sections are arranged to run around the pairs of wheels 123 and over the wheels 128 and its end portions are tied to the anchor pins 117 on the rear mount 110. The piston 124 is operated by a fluid delivered by a pump 131 to the cylinder 120 from a supply tank 132 through a tube 133 in which is interposed a control lever 131'. This pump 131 is driven by the sprocket chain 63.

A crumber 134 including a boom 134' extends rearwardly from the rear mount 110 between the grade holder boom 108 and the shovel boom 76. This crumber boom 134 includes a pair of laterally spaced square tubular beams 135 pivoted at their front end portions to and between pairs of bearing lugs 136 on the top member of the rear mount 110 for vertical swinging movement. The two crumber beams 135 are rigidly cross-connected at their rear or free end portions by an angle bar 137. The crumber boom 134' further includes a reinforcing truss 138. Each crumber beam 135 has on its free end a down-turned extension 139 that is perpendicular thereto.

The crumber 134 further incluudes a transverse scraper blade 140, the width of which corresponds to the width of the trench dug by the shovels 103. The shape of the scraper blade 140 conforms to the arc of a circle having its center substantially at the axis of the idle sprocket wheel 97 on the shovel boom 76. This scraper blade 140 is in front of the crumber beam extension 139, is rigidly secured at its upper edge to the crumber beams 135 and said crumber beam extensions 139 afford a base of resistance for the scraper blade 140 at its lower portion. The purpose of the scraper blade 140 is to smooth the bottom and sides of the trench and push surplus dirt to the shovels 103.

A pair of rearwardly projecting side plates 141, between which the crumber beam extensions 139 extend, is rigidly secured to said extensions and the scraper blade 140, as indicated at 142. On the back of the scraper blade 140 is a pair of extension plates 143, to increase the width of said scraper blade when shovels of a greater width are used in place of the shovels 103. These scraper blade extension plates 143 are adjustably secured to the scraper blade 140 by nut-equipped bolts 144 which extend through holes in said scraper blade and horizontal slots 145 in its extension plates 143, see Figs. 6 and 9.

The crumber 134 is held down to its work by a hydraulic ram 146 attached to the grade holder beam 108 and includes a cylinder 147 that is upwardly and rearwardly inclined. This cylinder 147 is pivoted at its lower end to the intermediate portion of a horizontal pin 148 that extends through any one pair of vertically spaced holes 149 in the side plates 149' between the crumber beams 135 and their extensions 139. A piston 150 in the cylinder 147 has a piston rod 151 that works through the upper end of said cylinder. This piston rod 151 at its outer end is pivoted to the intermediate portion of a horizontal pin 152 that extends through the rearmost pair of horizontally spaced holes 153 in a pair of depending side plates 154 on the grade holder beam 108. Obviously, the ram 146 may be adjusted vertically relative to the crumber 134 and horizontally relative to the grade holder beam 108. The piston 150 is operated by a fluid supplied to the cylinder 147 through a tube 155 leading from a lever-operated pump 156 that is in communication with the fluid tank 132.

The crumber further includes a flat horizontal slide 157 that rests on the bottom of a trench and supports the crumber. This slide 157 has at its transverse center a longitudinal shoe 158 that is V-shaped in cross-section and has a beveled front end 158'. The slide 157 is pivoted at its front end to the lower edge portion of the scraper blade 140, as indicated at 157', for vertical swinging movement.

A hydraulic ram 159 is provided for normally holding the slide 157 against pivotal movement and includes a cylinder 160 that is upwardly and forwardly inclined. Within the cylinder 160 is a piston 161 having a piston rod 162 that works through the upper end of said cylinder. On the slide 157 are front and rear pairs of upstanding bearing lugs 163 having aligned holes 163'. These bearing lugs 163 are bolted to members 164 on the slide 157 that span the shoe 158. A pin 165 is mounted in the rear pair of bearing lugs 163 and the cylinder 160 at its lower end is pivoted to this pin. Integral with the crumber beams 135 and their extension 139 is a pair of rearwardly projecting bearing plates 166 having therein upper and lower aligned holes 166'. A pin 167 is mounted in the upper holes 166' in the bearing plates 166 and the piston rod 162 at its upper end is pivoted to said pin.

Obviously, the hydraulic ram 159 may be adjusted relative to the scraper blade 140 by shifting the pin 165 to the front pair of bearing lugs 163, and it may also be adjusted by shifting the pin 167 into the lower pair of holes 166' in the bearing plates 166 to increase the angle between the scraper blade 140 and the slide 157.

Fluid is supplied to the cylinder 160 to operate the ram 159 through a tube 168 leading from a lever-operated pump 169 in communication with the fluid tank 132 to said cylinder.

Mounted on the slide 157 is a sand box 170 comprising a skeleton frame 171 and side plates 172.

On the bed 25 facing the control lever 131' and the pumps 156 and 169 is a seat 173 for an operator.

The channel in the bottom of the trench formed by the shoe 158 on the slide 157 holds the tile placed therein aligned and from rolling. The sides of the sand box 170 keep dirt on the sides of the trench from falling in and interfering with the laying of the tile.

As the loaded shovels 103 are moved by the sprocket chain 95 upwardly around the driven sprocket wheel 96, the dirt in the shovels 103 will slide therefrom and be precipitated onto a cross-conveyor 174 and deposited at one side of the trench. The cross-conveyor 174 is a wide endless belt 175 that runs over a driven roll 176 and an idle roll, not shown, journaled in bearings 177 on the bed 25. The roll 176 is driven from the shaft 67 by a sprocket chain 178 that runs over a sprocket wheel 179 on the rear end portion of said shaft and a sprocket wheel 180 on the front end portion of the shaft 181 of the driven roll 176.

A sheet metal guard 182 has its longitudinal edge portions reinforced with angle bars 183. This guard 182 at one of its ends is rigidly secured to the side frames 53 at the upper end of the bars 54, extends horizontally and forwardly therefrom and is then curved outwardly and forwardly therefrom and hence downwardly and inwardly to a point over the adjacent longitudinal edge portion of the cross-conveyor 174. The purpose of the guard 182 is to direct dirt precipitated from the shovels 103 onto the cross-conveyor 174.

A pair of laterally spaced dirt shields 184 is secured to the main side frames 53 on the inner sides thereof and project rearwardly thereof. These dirt shields 184 will hereinafter be fully described.

A pair of cleaners 186 is provided to cut soil off the shovels 103 that adheres thereto and thus eliminates any sticky soil being returned back into the trench. The cleaners 186 include a pair of scraper bars 187 that extend transversely inwardly from opposite sides of the machine, normally in front of the shovel drive shaft 60. The scraper bars 187 have on their outer ends laterally and rearwardly projecting two-part short arms 188 provided at their outer ends with hubs 189 on the inner end portions of a pair of short rock shafts 190. Normally, the shafts 190 are held from turning, while the scraper bars 187 are in normal positions, by shearing pins 189' that extend through aligned holes in the bearings 191 and the shafts 190, see Fig. 5. These shafts 190, at their outer end portions, are journaled in the bearings 61' that form forward extensions of the bearings 61 and their inner end portions are journaled in bearings 191 integral with the inner ends of the sleeve 82' and are forwardly offset from the shovel drive shaft 60. The bearings 61, 61', sleeve 82' and bearing 191 on each side of the machine are an integral unit. The two bearings 191 hold the clamps 82 against axial shifting movement on the shovel drive shaft 60. In normal position of the scraper bars 187, their inner ends are spaced apart sufficiently to permit the shovel posts 103' to pass therebetween, see Fig. 5. It is important to note that the scraper bars 187 are in diverging relation to the projected axis of the rock shaft 190 and that said shafts are in converging relation in respect to the shovel drive shaft 60.

Each rock shaft 190 has on its outer end a crank arm 190'. A long rearwardly projecting rod 192 has on its front end a bifurcated head 193, between the prongs of which the crank arm 190' projects and is pivoted thereto at 194. The rod 192 extends through an apertured lug 195 on the adjacent side frame 53 and has on its outer end a washer and a nut 196. A long compression spring 197 encircling the rod 192 is normally slightly compressed between the head 193 on said rod and the lug 195. A short compression spring 198 encircling the rod 192 is normally also slightly compressed between the lug 195 and the washer and nut 196. During the upward travel of the shovels 103 around the driven sprocket wheel 96, the inner surfaces of said shovels pass just out of contact with the scraper bars 187.

In case of undue strain on either one or both of the scraper bars 187, in removing sticky soil that may adhere to one of the shovels 103, or in removing a rock or other obstruction therefrom, one or both of the shearing pins 189' will be severed and allow the engaged scraper bar or bars to move with the respective shovel 103. Movement of one or both of the scraper bars 187 with a shovel 103 will turn one or both of the shafts 190 and thus cause the crank arm or arms 190' to compress one or both of the long springs 197 and the progressive increase in the tension of one or both of said springs will progressively increase the resistance of the scraper bar or bars 187 to remove an obstruction from a shovel 103. The eccentric pivotal movement of the scraper bars 187, relative to the axis of the shaft 60 about which the shovels 103 are being moved by an engaged obstruction on a shovel 103, will, during extreme rearward movement of said scraper bar or bars, cause the said scraper bars to move downwardly out of contact with the engaged obstruction in case it cannot be removed. Obviously, due to the novel arrangement and mounting of the scraper bars 187, they separate endwise to clear the driven sprocket wheel 96 as they are moved upwardly by an obstruction on one of the shovels 103.

When the machine is digging, the hydraulic lift 119 is free, the crumber slide 157 and its shoe 158 are resting on the bottom of the trench, the grade holder 108 at its rear end is supported from the crumber by the ram 146, and said grade holder supports the shovel boom 76, to which it is rigidly secured by the mounts 109 and 110 with its shovels 103 in digging position. To permit the shovel boom 76 to dig deeper, it is only necessary to release the fluid in the ram cylinder 147 and the weight of said boom will move the same down.

It will thus be seen that the hydraulic grade holder 108 is used to aid the operator in obtaining a smooth and more accurate grade line in the bottom of the trench. The shoe 158 is used to impart straight line movement to the shovels 103.

The shovel boom 76 is lifted out of a trench by means of the hydraulic lift 119 and held thereby raised above the ground together with the grade holder 108 when the machine is travelling on the road or being reset, etc. The rear end portion of the crumber boom 135' is connected to the grade holder 108 by means of a chain 199. This chain 199, when the machine is operating, is slack so as not to interfere with the operation of the ram 146 and the relative adjustments of the crumber and the grade holder 108. When the shovel boom 76 and the grade holder 108 are being lifted and held above the ground by the hydraulic lift 119, the chain 199 holds the crumber suspended from said grade holder.

Referring now in detail to the dirt shields 184, each of which is made of a single sheet of metal reinforced at its entire marginal portion, except its front vertical edge portion, by an angle bar 200 on the outer side thereof: Each dirt shield 184 is further reinforced by a horizontally disposed intermediate angle bar 201, substantially at its vertical center and extends the full length of said dirt shield. The vertical flange of the angle bar 201 is turned downwardly and its front end portion overlaps an inner ear 202 on a plate 203 and is pivoted thereto, as indicated at 204. The front end portions of the horizontal flanges of the angle bars 201 and 205 are cut away to clear the ears 202 and 207 during the raising or lowering of the dirt shields 184. The plate 203 is rigidly affixed to the rear end of the bed 25 and supports the dirt shield for vertical swinging movement.

The horizontal brace 205 is secured at one of its end portions to the angle bar 201 at its rear end portion by a pair of bolts 206, see Fig. 24. The forward end portion of the vertical flange of the angle bar 205 overlaps an outer ear 207 on the plate 203 and is adjustably attached thereto by a nut-equipped bolt 208 that extends through the ear 207 and one of a pair of horizontally spaced holes 209 in said flange. The two ears 202 and 207 on the plate 203 are laterally spaced a considerable distance apart and hold the brace 205 obliquely to the dirt shield 184. By shifting the bolt 208 from one of the holes 209 to the other, the operative length of the brace 205 may be varied, at will. This adjustment of each brace 205 spaces the dirt shields 184 at their outer ends different distances apart to permit the use of shovels 103 of different widths. A tie-rod 210 connects the brace 205 near its front end portion to the dirt shield 184, see Fig. 23.

On the inner sides of the main side frames 53 is a pair of sheet metal side plates 211 secured to said side frames and forming forward extensions of the dirt shields 184. Each side plate 211 has an upwardly and outwardly inclined dirt-deflecting top member 212 and an upwardly and rearwardly inclined dirt-deflecting top section 213. These dirt-deflecting sections 212 and 213 direct dirt precipitated from the shovels 103 either back into the trench or onto the cross-conveyor 174. The side plates 211 are connected at their upper front end portions by a cross-tie angle bar 211'. Secured to each dirt shield 184 is a forwardly projecting extension 214 that closes the gap between the dirt shield 184 and the respective side plate 211.

The dirt shields 184 are simultaneously raised or lowered by means of a winch 215 and the following connections, to wit: A rock shaft 216 journaled in bearings 217 on the angle bar 58 has on its right-hand end an arm 218 and on its left-hand end is a lever 219 having a short arm 220 that is a duplicate of the arm 218 and a long arm 221. A pair of cables 222 is attached at one of their ends to eyes 223 on the outer end portions of the angle bars 201 and attached at their other ends to the arms 218 and 220. A third cable 224 is attached at one of its ends to the long arm 221 and its other end portion is wound on the winch 215. The winch 215 is mounted on the left-hand angle bar 57 and is provided with a dog 225 and a co-operating ratchet wheel 226 to prevent the winch 215 from turning by the pull of the dirt shields 184 thereon, and thus unwind the cable 224 therefrom. Obviously, by operating the winch 215, the dirt shields 184 may be raised or lowered, at will.

The purpose of the dirt shields 184 is to insure clean shoulders at the top of a trench being dug. As the shovels 103 move upwardly with full loads of dirt, they pass between the dirt shields 184 and the side plates 211, and which dirt shields and side plates will hold the dirt from falling off said shovels.

The drawings illustrate a commercial form of the trench excavator, but it will be understood

What I claim is:

1. In a machine of the class described, an engine-propelled vehicle, a rearwardly projecting shovel boom pivoted at its front end to the vehicle to swing vertically, a hydraulic lift for raising or lowering the shovel boom, shovels mounted on the shovel boom to travel an endless course, means for operating the shovels from the engine, front and rear mounts on the shovel boom, a grade holder beam overlying the shovel boom and the mounts, said grade holder beam being rigidly secured to the mounts at its front end portion, a crumber including a boom extending longitudinally between the shovel boom and the grade holder beam and pivoted at its front end portion to the rear mount, said crumber boom having a downturned rear extension, a scraper blade in front of the crumber boom extension, a slide pivoted to the lower edge portion of the scraper blade, ram controls connecting the grade holder beam and the crumber and the slide and the crumber.

2. In an excavator for cutting a trench having a smooth bottom on an accurate grade line, a vehicle provided with a rearwardly projecting shovel boom horizontally pivoted at its front end in respect to the vehicle whereby the rear end of the shovel boom may be swung vertically, shovels mounted on the shovel boom to travel an endless course, power means for operating the shovels, a grade holder beam overlying the shovel boom and immovably secured to said shovel boom, a crumber boom overlying the shovel boom and positioned between said shovel boom and the grade beam, the crumber boom projecting rearwardly from the vehicle and being horizontally pivotally supported at its front end by the shovel boom whereby its rear end may be swung vertically, the rear end of the crumber boom being supported upon a slide disposed on and adapted to slide over the bottom of the trench, a scraper blade carried by the rear end of the crumber boom and disposed immediately behind the shovels in their movement through the rear end of their course of travel, and a connection between the rear end of the crumber boom and the grade beam for supporting the grade beam and thereby supporting the rear end of the shovel boom in respect to the bottom of the trench.

3. A construction as defined in claim 2 wherein, the connection between the rear end of the crumber boom and the grade beam is in the form of a longitudinally extensible and contractable member, and means for extending and contracting said member for vertically selectively adjusting the rear end of the shovel boom in respect to the bottom of the trench.

4. A construction as defined in claim 2 wherein, the supporting engagement between the rear end of the crumber boom and the slide is at the forward end of the slide and is in the form of a horizontally disposed pivot, means interconnecting the rear end of the slide with the crumber boom at a point above its pivotal connection with the slide for preventing pivotal movement of the slide in respect to the crumber boom, said means being in the form of a longitudinally extensible and contractable device, and means for selectively extending or contracting said device for selectively raising and lowering the front end of the slide.

5. A construction as defined in claim 2 wherein, the connection between the rear end of the crumber boom and the grade beam is in the form of a hydraulic ram, means for selectively extending and retracting the ram for raising and lowering the rear end of the grade beam for selectively supporting the rear end of the shovel boom in respect to the bottom of the trench, the connection between the rear end of the crumber boom and the slide being in the form of a horizontal pivot positioned at the front end of the slide, a hydraulically operated ram interconnecting the rear end of the slide with the crumber boom at a point above the connection of the crumber boom with the slide, and means to selectively extend and retract said ram to selectively raise and lower the front end of the slide.

6. A construction as defined in claim 2 wherein, power means is provided on the vehicle and connected to the shovel boom for raising it together with the interconnected crumber boom, grade beam and slide from the trench and lowering said elements into the trench, and means interconnecting the grade beam and crumber boom and operative only when the parts are raised from the trench for supporting the crumber boom and its attached slide from the grade beam.

7. A construction as defined in claim 2 wherein, a pair of spaced apart upwardly extending mounts are rigidly secured to the shovel boom, the grade holder beam overlying and having rigid immovable connection with said mounts, and the crumber boom having its pivotal support on one of said mounts.

8. A construction as defined in claim 2 wherein, a pair of mounts are rigidly secured to the shovel boom and extend upwardly therefrom in spaced relationship, the grade holder beam overlying and being rigidly immovably secured to said mounts, the crumber boom having its pivotal support on one of said mounts, and said mounts having a central passageway through which the shovels travel.

9. A construction as defined in claim 2 wherein, the crumber boom at its rear end comprises an extension disposed at substantially right angles to the crumber boom proper, the scraper blade being arcuate shaped in vertical section, the lower edge of said blade being secured adjacent the lower end of said crumber boom extension, and the upper edge of said blade being secured to the crumber boom proper at a point forward of the rear end of the crumber boom.

DANIEL F. PRZYBYLSKI.

REFERENCES CITED

The following references are of record in the file of this patent:

UNITED STATES PATENTS

| Number | Name | Date |
| --- | --- | --- |
| 915,963 | Hovland | May 23, 1909 |
| 969,187 | Poulter | Sept. 6, 1910 |
| 1,073,227 | Funk | Sept. 16, 1913 |
| 1,287,781 | Steenrod | Dec. 17, 1918 |
| 1,305,270 | Farrar | June 3, 1919 |
| 1,767,417 | Weber | June 24, 1930 |
| 1,974,668 | Souter | Sept. 25, 1934 |